UNITED STATES PATENT OFFICE.

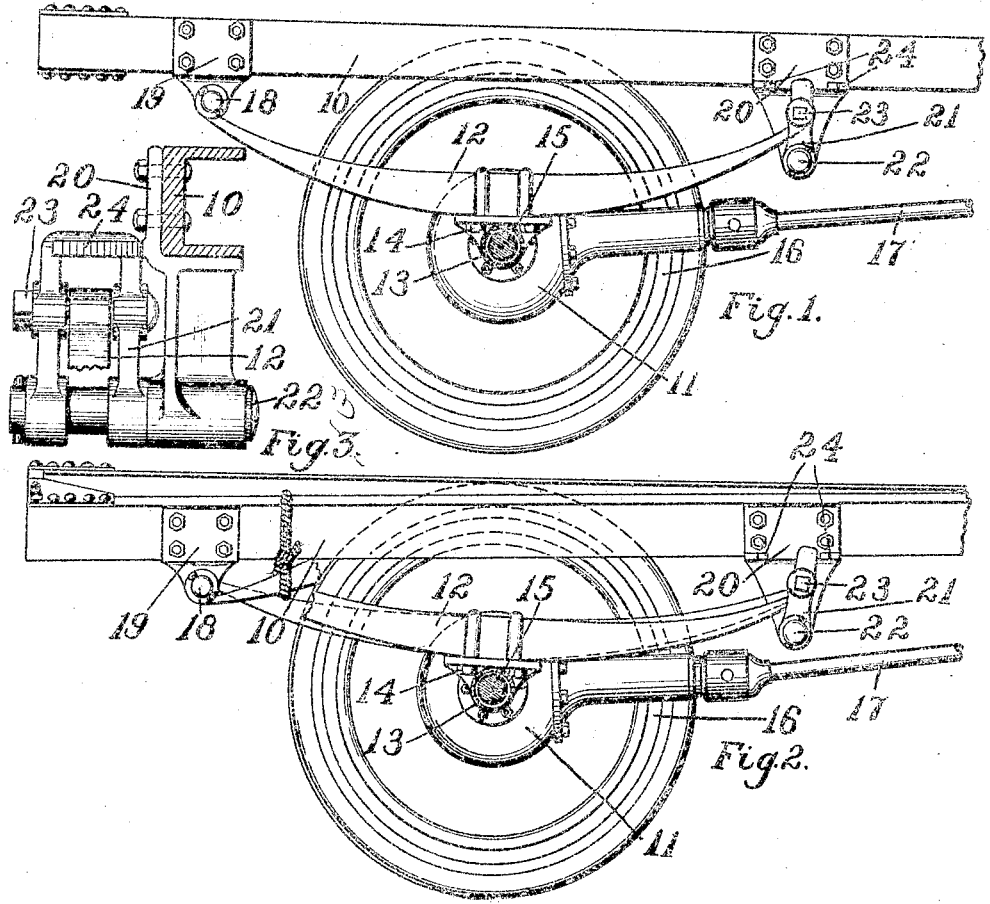

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,293,709.　　　　　Specification of Letters Patent.　　Patented Feb. 11, 1919.

Application filed February 8, 1918. Serial No. 767,113.

*To all whom it may concern:*

Be it known that I, HAROLD D. CHURCH, a citizen of the United States, and resident of Detroit, Wayne county, State of Michigan, have invented certain new and useful Improvements in Motor-Vehicles, of which the following is a specification.

This invention relates to motor vehicles, and particularly to the springs and driving mechanism.

One of the important points that is always in the engineer's mind in designing a high-class motor vehicle is that one part of the vehicle should reinforce another to such an extent that upon the failure of any part that is liable to breakage, another part of the vehicle shall temporarily take up the normal work of the disabled part, so that the vehicle may be driven to a suitable place for repairs. One of the parts of a vehicle that is more or less liable to breakage is the spring. Because of the more or less uncertainty of the spring, many designers have refrained from transferring the drive from the driving axle to the vehicle frame through the spring, placing on the vehicle instead a pair of radius rods or distance bars and thus relieving the springs of all driving effort. But of course these radius rods add weight and wearing parts to the vehicle and they do the work that the springs could just as well do so long as the springs remain intact.

One of the common constructions in which the spring transmits the drive to the frame includes a semi-elliptic spring, one end of which is connected to the frame to transmit the drive and the other end is connected therewith through a non-drive-transmitting connection. It is the principal object of the present invention to provide means whereby the drive may be transmitted through the non-drive-transmitting connection with a minimum disarrangement of the parts of the vehicle in case the other end of the spring should fail.

With the above and other objects in view, this invention may be said to consist of a semi-elliptic spring connected to the vehicle axle between its ends, pivotally connected at one of its ends directly to the vehicle frame, and connected at its other end to the vehicle frame through a link or shackle, and means mounted upon, or secured to the frame for limiting the swinging action of said shackle in case the driving axle is moved slightly forwardly or rearwardly relative to the frame by reason of the failure of the other end of the spring.

A specific embodiment of this invention is herein described in detail, but it will be understood that the invention is not limited to the exact details shown, as it will be apparent that changes may be made therein without departing from the spirit or scope of the invention.

Referring to the drawings which form a part of this specification,

Figure 1 is a side elevation of the rear end of a motor vehicle embodying this invention, the rear wheel being removed and the axle shown in section;

Fig. 2 is a view similar to Fig. 1, with one of the spring ends broken, illustrating the action of the link connection;

Fig. 3 is an enlarged transverse sectional view through the frame adjacent one of the spring brackets.

The rear end of a motor vehicle frame is indicated at 10 and is supported upon an axle 11 through semi-elliptic springs 12. The axle 11 is shown as in the form of a stationary casing 13, to which the spring pads 14 are rigidly secured, and the driving sections 15 of the axle are connected to the wheels 16 and are operated through suitable bevel or other gears and differential gearing from the propeller shaft 17, which may be suitably connected to the motor mounted on the front end of the frame and not illustrated in the drawings. The axle 11 therefore becomes the driving axle of the vehicle and its driving action must be transferred to the frame 10 through suitable running gear. In the present instance, the rear end of the spring 12 is pivoted at 18 directly to a bracket 19, which is bolted to one of the side bars of the frame 10. Therefore, since there is no link connection between this rear end of the spring 12 and the frame, the driving effort of the axle will be duly transferred to the frame through the spring.

To properly take care of the straightening out of the spring as a load is put upon the frame, the front end of the spring is connected to a bracket 20 through a link or shackle 21, the link being pivoted to the bracket at 22 and to the front end of the spring at 23. Of course the bracket 20 is suitably bolted to the side member of the frame 10, as shown in the drawings.

It will be understood that a similar spring construction is arranged on the other side of the vehicle, so that the driving action of the axle 11 is normally transferred to the frame through the rear ends of the two semi-elliptic springs 12, and the torsional reaction of the axle is also taken through the spring.

From the above description, it will be readily seen that should the rear end of one of the springs 12 be broken, the spring end on the other side of the vehicle would be subjected to unusual driving and torsional strains and the spring pad would be twisted about the spring, thus causing the shackled end of the broken spring to swing around the pivot 22 to a dangerous degree.

For the purpose of preventing the shackle 21 from swinging about the pivot 22 beyond a predetermined and safe degree and thus permitting the shackled end of the spring to become the driving end, the bracket 20 is provided with means against which the link 21 may abut and thus cause the forward end of the broken spring to partake of the nature of the directly pivoted end of the spring and thus properly transfer the drive of the axle to the frame. This means is shown herein as in the form of integral lugs 24 extending outwardly from the bracket 20 in the path of the free end of the link 21, the lugs 24 being separated a sufficient distance to permit the link to swing sufficiently under normal conditions, that is, when the spring 12 is whole.

Of course, it will be understood that in case of the breakage of one end of the spring, as in Fig. 2, one side of the frame 10 will drop down slightly relative to the axle, due to the entire load being taken up by the remaining unbroken end of the spring and the spring on the other side, this dropping of the frame being clearly illustrated, but this of course will not in any way prevent the vehicle from being driven a considerable distance without injury, and by reason of the lugs 24 limiting the swinging action of the link 21, the drive of the axle is transferred through the shackled end of the crippled spring.

Although a specific construction has been described it is to be understood that the invention is not limited to the exact details shown but includes modifications and changes which come within the scope of the appended claims.

Having thus described my invention, what I claim and desire to secure by Letters Patent is:

1. In a motor vehicle, the combination with the frame and driving axle, of a spring secured intermediate its ends to the axle, a direct pivotal connection between one end of the spring and the frame to transmit the drive from the spring to the frame, a non-drive-transmitting connection between the other end of said spring and the frame, and normally inoperative means independent of said connection arranged to coöperate with said connection and take the drive in case the other end of the spring should fail.

2. In a motor vehicle, the combination with the frame and driving axle, of a spring secured intermediate its ends to the axle, a direct pivotal connection between one end of the spring and the frame to transmit the drive from the spring to the frame, a non-drive-transmitting link connection between the other end of said spring and the frame and normally inoperative means independent of said connection arranged to limit the movement of the link and take the drive in case the other end of the spring should fail.

3. In a motor vehicle, the combination with the frame and the driving axle, of a spring secured intermediate its ends to the axle, said spring being directly pivoted at its rearward end to the frame, a link connecting the forward end of said spring to the frame, and means secured to the frame for limiting the swinging action of said forward link upon failure of the rear end of the spring.

4. In a motor vehicle, the combination with the frame and driving axle of a spring secured intermediate its ends to the axle, a direct pivotal connection between one end of the spring and the frame to transmit the drive, a bracket on the frame, a link, a pivot pin pivotally connecting the link and bracket, a second pivot pin pivotally connecting the link and spring, said link having an extension, and a stop arranged to coöperate with said extension to limit the swinging movement of the link and take the drive in case the other end of the spring should fail.

In testimony whereof I affix my signature in the presence of two witnesses.

HAROLD D. CHURCH.

Witnesses:
J. L. BLAKESLEE,
LE ROI J. WILLIAMS.